United States Patent Office 3,318,705
Patented May 9, 1967

3,318,705
BREAKFAST CEREAL PROCESS
Adolph S. Clausi, Cos Cob, Conn., Willard L. Vollink, Battle Creek, Mich., and Elmer W. Michael, Evansville, Ind., assignors to General Foods Corporation, White Plains, N.Y., a corporation of Delaware
No Drawing. Filed June 14, 1965, Ser. No. 463,930
14 Claims. (Cl. 99—80)

The present application is a continuation-in-part of our copending U.S. patent application Ser. No. 345,121 filed Feb. 17, 1964, now abandoned for "Breakfast Cereal Process," which application in turn is a continuation-in-part of U.S. patent application Ser. No. 52,375, filed Aug. 29, 1960 for Cereal Process, now issued as U.S. Patent No. 3,121,637.

This invention relates to a new and improved process for the production of ready-to-eat breakfast cereals. More particularly, the invention relates to a method of preparing cooked doughs from cereal flours and like starch-containing materials for the production of ready-to-eat breakfast cereal products either in the form of a puffed piece or a toasted flake.

In the production of ready-to-eat breakfast cereals it is generally required that the starch-containing material be prepared in the form of a moist dough, say of 30% to 40% moisture, which is eventually cooked to gelatinize the starch in the dough and transform it into a tenacious pliable mass capable of further handling. In such later handling the cooked dough mass is extruded and sub-divided into dough pieces which may be shaped and eventually gun-puffed or which may be flaked and eventually oven toasted to produce a desirable blistered crisp product.

In the production of breakfast cereal products by either of these two alternatives, it is important that the cereal dough be cooked to a uniform degree for efficient flaking. To explain, in the present commercial process for making breakfast cereals in flake form, a number of processing steps are involved which call for considerable capital investment and operating expense. Generally, the material of cereal grains either in grit or dough form is cooked at a moisture level ranging upward from 30% for 60 to 150 minutes in the presence of various flavoring materials, the longer cooking periods being required in the case of grits. Cooking is customarily carried out by steaming the ingredients in a pressure cooker where the materials can be gelatinized under pressures ranging from 15 to 30 p.s.i.g. Such long cooking times at the elevated temperatures employed are required since the products being cooked are natural grains, parts of grains, or non-homogeneous agglomerates of non-uniform size. For example, cereal flakes produced from corn require 150 minutes of cooking at 17 p.s.i.g. and bran flakes (wheat flour and broken wheat particles) require 60 minutes of cooking at 15 p.s.i.g. The cooked material at the aforesaid high moisture level must then be dried to about 20% moisture and tempered for an additional extended period, say at least one hour, and ranging up from four to eight hours for larger particles such as corn grits. This moisture reduction and tempering is for the purpose of permitting the mass of grains or dough pieces to be flaked. Unless such drying is practiced, the grain or dough pieces will adhere to the flaking roll or its doctor blade making it impossible to get a clean, distinct flake for later toasting. Moreover, in the eventual flake, the degree of cooking can vary such that the quality of the toasted flake itself will vary from the desirable crisp blistered goods to a dense, lifeless product.

It is an object of the present invention to provide in the art of producing ready-to-eat breakfast cereal products a process which is relatively simple and inexpensive and which permits the starch-containing material to be processed in a more uniform and controllable manner for uniform product quality. It is also an object of the present invention to provide dough pieces which produce a uniformly high yield of flaked product. The method should be of a type which does not introduce handling difficulties such as those outlined hereinabove for the flaking of dough pieces or cooked grains to produce flaked products. It is a further object of the present invention to have a process calling for shorter and less severe cooking procedures whereby more of the material nutrition is retained in the cooked piece, and savings can be practiced in terms of the time and temperatures required to produce a properly cooked dough for subsequent treatment. It is still another object of the present invention to provide a process for preparing breakfast cereal products which are suitable and satisfactory for eating either as hot cereals or as cold cereals. A still further object is the preparation of breakfast food cereals having improved nutritive properties.

It has now been discovered that the objects of the present invention may be met by gelatinizing hydrated, ungelatinized cereal dough pieces having a major proportion of at least one highly nutritious cereal flour, such as soy flour, at a level ranging up to about 85%, typically from about 5% to about 10%, and from about 1.5% to about 10% milk protein, which dough pieces have a moisture content of from about 22% to about 36%, at a temperature of from about 215° F. to about 265° F. at steam pressures of from about 1 to about 23 p.s.i.g., cooling the gelatinized cereal dough pieces to a temperature whereat they are less plastic and their stiffness is increased, as by cooling them to temperatures from above about 150° F. to about 205° F., pelletizing the cereal dough pieces, partially drying the gelatinized cereal dough pieces to form about 5% to about 21% moisture, mechanically modifying the shape of the dough pieces, and drying the cereal dough pieces to a moisture content of from about 1% to about 3.5% moisture under conditions such that the temperature of the cereal dough pieces does not exceed about 250° F.

As used in the present invention, the term "dough pieces" refers to the pieces which result when cereal flour or cereal flours with or without other ingredients present in the breakfast cereal product are treated with sufficient moisture to form agglomerates upon mixing of the flour and moisture or upon mixing of the flour and other ingredients and moisture. The term "pelletizing" refers to the extrusion of the cereal dough through a conventional, commercial, pelletizing machine to form pellets. The term "mechanically modifying" refers to the process whereby the dough pieces pass between flaking rolls to produce cereal flakes, are vacuum puffed, or are treated by other cereal finishing processes at temperatures which will not raise the cereal piece temperature to above about 250° F.

The process of the present invention may be accomplished by agglomerating the breakfast cereal solids, that is, the cereal flour or a blend of cereal flours, preferably cereal flours of a high protein content, with or without other ingredients present in the breakfast cereal product, with sufficient moisture to provide a final moisture content of from about 22% to about 36% until the mass of dough pieces which form is homogeneously blended. The mass of dough pieces may then be cooked or it may first be pelletized and then cooked. The moisture content of the cereal mass should not exceed about 36% moisture immediately prior to agglomeration to form dough pieces nor should it be less than about 22% moisture. At moisture contents greater than about 36%, the cereal mass does not agglomerate properly to form the dough pieces. At moisture contents below about 22%, insufficient moisture is present for adequate gelatinization to take place during cooking. While it is preferred to cook the cereal flours after they have been blended, it is possible to cook the flours separately and blend them after cooking.

When the hydrated dough pieces having a moisture content of from about 22% to about 36% are cooked before being pelletized, the product is cooked at the moisture content of the agglomerated mass, that is, from about 22% to about 36%. Preferably, the dough pieces should have a moisture content of from about 26% to about 30% when steam is directly contacted with the mass. Where the product is cooked by indirect heating, such as by applying heat to a jacketed wall, the preferred moisture content is from about 30% to about 32%. The product is cooked at a temperature of from about 215° F. to about 265° F. at steam pressures of from about 1 to about 23 p.s.i.g., and preferably at a temperature of from about 227° F. to about 250° F. (from about 5 to about 15 p.s.i.g.). At temperatures below about 215° F., insufficient cooking takes place during the cooking period and at temperatures above about 265° F., an undesirable strong bitter flavor starts to develop.

The product is cooked from about 5 to about 20 minutes, the longer period of time being employed where lower cooking temperatures are used and the shorter period of time where higher temperatures are used. While the cereal flours usually agglomerate in the mixer to form the dough pieces, it is not essential that they do so provided that agglomeration takes place in such case in the cooking step.

Where the cooked, non-pelletized mass leaving the cooker is non-homogeneous in particle size, it is preferable to pass the cooked mass through a lump breaker to provide a mass having a homogeneous particle size.

The cooked mass is cooled to a temperature whereat it is less plastic and its stiffness is increased, as by cooling it to temperatures from above about 150° F. to about 205° F. The unpelletized, cooled, cooked mas may then be pelletized by any conventional pelletizing machine. By cooling the cooked pellets or dough shapes to the aforestated temperatures, requisite stiffness and a less plastic non-sticky condition is provided which facilitates pelletizing. Previously, it had been thought that temperatures above 150° F. were unsuitable for pelletizing.

As an alternative, the agglomerated, uncooked cereal may be pelletized in a conventional commercial pelletizing machine and then cooked at a temperature of from about 215° F. to about 265° F. for from about 5 to about 20 minutes.

As before, the moisture content of the pellets during cooking should be in the range of from about 26% to about 32% preferably from about 26% to about 29% where the pellets are directly contacted with steam and from about 30% to about 32% where the pellets are heated indirectly.

The pellets of cereal flour which were cooked either before or after pelletizing are then partially dried to a moisture content of from about 5% to about 21%, preferably from about 15% to about 21% where the pellets are to be used to prepare flakes or shreds or from about 5% to about 15% where the pellets are to be puffed at low temperatures under reduced atmospheric pressure.

The partially dried pellets are then mechanically modified by any conventional cereal finishing technique such as flaking through rolls, shredding, or puffing at temperatures which will not raise the cereal temperatures to above about 250° F. The treated or mechanically modified cereal is then dried to a moisture content of from about 1% to about 3½% moisture at an air temperature of from about 250° F. to about 350° F., the product temperature at no time exceeding about 250° F. In the case of certain types of cereal products, higher drying temperatures may be employed provided the protein and carbohydrate content of the cereal product is not degraded by such processing.

The present invention produces the desired results with all cereal flours, although eminently satisfactory results have been obtained with cereal flours containing from about 5% to about 85% soy flour. Such flours are highly nutritious and in such cases it is desired to keep the nutritional loss which occurs during processing to a minimum.

Additional nutritive benefits are obtained by incorporating from about 1.5% to about 10% milk protein into the breakfast cereal prepared in accordance with the present invention. The milk protein may be added in any convenient form, such as, for example, non-fat milk solids, casein, sodium caseinate, calcium caseinate, lactalbumin, or any combination thereof.

Sweetening agents may be incorporated into the breakfast cereal products of the present invention. Sucrose is a preferred sweetening agent but other sweetening agents may also be employed. As examples of such other sweetening agents, there may be mentioned other sugars, for example, dextrose and levulose, and synthetic sweetening agents, for example, saccharin, N-cyclohexylsulfamic acid, and the sodium and calcium salts of said synthetic sweeteners.

Other ingredients which are useful in improving taste, appearance and nutrition may be present such as salt, emulsifiers, flavoring, spices, coloring matter, vitamins and minerals.

While it is advantageous according to the present invention first to blend the dry ingredients and then to add the liquid ingredients, before carrying out the steps of the present invention, it is also possible to treat the cereal flour alone according to the process of the present invention and thereafter to add the other desired ingredients, either after the processing of the cereal flour has been carried out, or by adding these ingredients at any convenient step during the process of the present invention. Thus, for example, the sugar and other non-cereal flour ingredients may be coated on the treated dough pieces.

The invention will now be more fully described by reference to the accompanying examples:

EXAMPLE 1

| Ingredients: | Percent composition by weight |
|---|---|
| Oat flour | 60–70 |
| Rice flour | 7–12 |
| Soy flour | 5–10 |
| Sucrose | 5–15 |
| Lecithin | 0.05–0.15 |
| Salt | 2–4 |
| Milk Casein | 1.5–10.0 |

*Process.*—The dry ingredients were homogeneously blended and sufficient moisture was added to form a mixture having a moisture content of 27–29%. The mass was blended until all of the dry material had formed agglomerates. The agglomerates were then introduced into a jacketed cooking vessel having agitating means. The mass was cooked and agitated at a temperature of 250° F. and a pressure of 15 p.s.i.g. for 8 minutes. At the end of such time, the farinaceous materials were thoroughly gelatinized and the agglomerates were passed directly from the cooker into an extruder having a pelletizing die with a rotary cut-off knife to produce discrete dough pieces or pellets having a diameter of about 3/16" and a length of about ¼". As it passed through the extruder, the dough material was cooled to between about 200° F. and 205° F. by heat conduction through the extruder wall before being pelletized. The pellets were dried to 20% moisture on a traveling screen drier which had circulating air at a temperature ranging from 250° F. to 350° F. passing over and around the pellets. The dried pellets were introduced to flaking rolls having a spacing of 0.01–0.05" to produce the cereal flakes. The flakes were dried to a moisture content of 1–3½% by use of a moving screen drier having an air temperature of 250° F.–350° F. At no time did the temperature of the product exceed 250° F.

The product obtained was a lightly toasted, highly nutritious cereal flake having excellent flavor and texture. When wheat flour was substituted for the rice flour in the foregoing formulations, equally satisfactory results were obtained.

EXAMPLE 2

| Ingredients: | Percent composition by weight |
|---|---|
| Corn flour | 70–80 |
| Soy flour | 5–10 |
| Sucrose | 5–15 |
| Lecithin | 0.05–0.15 |
| Salt | 2–4 |
| Lactalbumin | 1.5–10.0 |

*Process.*—The dry ingredients were homogeneously blended and sufficient moisture was added to form a mixture having a moisture content of 27–29%. The mass was blended until all of the dry material had formed agglomerates. The agglomerates were then introduced into a jacketed cooking vessel having agitating means. The mass was cooked and agitated at a temperature of 259° F. and a pressure of 20 p.s.i.g. for 6 minutes. At the end of such time, the farinaceous materials were thoroughly gelatinized and the agglomerates were passed directly from the cooker into a water-jacketed extruder having a pelletizing die with a rotary cut-off knife to produce discrete dough pieces or pellets having a diameter of about ⅜₆″ and a length of about ¼″. As it passed through the extruder, the dough material was cooled to about 190° F. before being pelletized. The pellets were dried to 20% moisture on a traveling screen drier which had circulating air at a temperature ranging from 250° F. to 350° F. passing over and around the pellets. The dried pellets were introduced to flaking rolls having a spacing of 0.01–0.05″ to produce the cereal flakes. The flakes were dried to a moisture content of 1–3½% by use of a moving screen drier having an air temperature of 250° F.–350° F. At no time did the temperature of the product exceed 250° F.

The product obtained was a lightly toasted, highly nutritious cereal flake having excellent flavor and texture.

EXAMPLE 3

A highly nutritious soy flake cereal was prepared according to the method described in the preceding examples from compositions containing from 5% to 15% sugar, from 1.5% to 10% milk protein, from 1% to 10% malt syrup, and from 2% to 5% salt, the balance of the composition consisting of soy flour. A specific example of such a composition is the following:

| Ingredients: | Percent composition by weight |
|---|---|
| Sucrose | 8 |
| Casein | 5 |
| Malt syrup[1] | 4 |
| Salt | 2.5 |
| Vanilla flavor | 0.1 |
| Soy flour | 80.4 |

[1] Malt syrup is the soluble extract of malt grain or a combination of malt grains.

Nutritionally, the cereal flakes prepared according to the present invention containing soy flour and milk protein are far superior to conventional commercial cereal flakes such as those prepared from corn, wheat or bran. In studies with rats, the average growth for 28 days in the case of cereal flakes such as those set forth in Example 1 resulted in a rat growth of 140–147 grams whereas rats maintained on conventional commercial flake cereals showed no gain. In addition to the cereal flakes, the rats were given a complete vitamin and mineral supplement. The results of such a study clearly demonstrate the nutritional superiority of breakfast cereal flakes prepared according to the present invention as compared to conventional commercial flake cereals.

While the cereal flakes prepared according to the present invention are eminently satisfactory as a cold breakfast cereal, it was unexpected to find that the flakes also produce a highly satisfactory hot breakfast cereal when hot water is added to them. Conventional cold breakfast cereals are totally unsuited for such purpose, forming an unpalatable dough mush in hot water. The cereal flakes of the present invention present a pleasing and novel texture and flavor to the consumer of hot cereals.

While the preceding examples illustrate several embodiments of the present invention, reference should be had to the appended claims for a definition of the scope of the invention.

What we claim is:

1. A process for preparing a breakfast cereal product, the breakfast cereal product being suitable for use as both hot and cold cereal which has retained substantially all of its pre-processing nutritive value, which comprises
   gelatinizing hydrated, ungelatinized dough pieces, comprising a major proportion of at least one nutritious cereal flour and from 1.5% to 10% milk protein, the dough pieces having a moisture content of from 22% to 36% moisture at a temperature of from 215° F. to 265° F. at a pressure of from 1 to 23 p.s.i.g.,
   cooling the gelatinized dough pieces to a temperature of from above 150° F. to 205° F.,
   partially drying the gelatinized dough pieces to from 5% to 21% moisture,
   pelletizing the dough pieces before partially drying,
   mechanically modifying the dough pieces and drying the dough pieces to a moisture content of from 1% to 3.5% moisture under conditions such that the temperature of the dough pieces does not exceed 250° F.

2. A process according to claim 1 in which the dough pieces comprise from 5% to 85% soy flour.

3. A process according to claim 1 in which the dough pieces comprise a major proportion of soy flour.

4. A process according to claim 1 in which the dough pieces consist essentially of from 1.5% to 10.0% milk protein, from 5% to 10% soy flour and the remaining cereal flour being selected from the group consisting of oat, rice, wheat and corn.

5. A process according to claim 1 wherein the dough pieces are pelletized before gelatinization.

6. A process according to claim 1 wherein the dough pieces are pelletized after gelatinization.

7. A process for preparing a breakfast cereal product, the breakfast cereal product being suitable for use as both hot and cold cereal which has retained substantially all of its pre-processing nutritive value, which comprises
   gelatinizing hydrated, ungelatinized dough pieces comprising a major proportion of at least one nutritious cereal flour and from 1.5% to 10% milk protein having a moisture content of from 26% to 29% moisture at a temperature of from 215° F. to 265° F. at a pressure of from 1 to 23 p.s.i.g. by direct contact with steam,
   cooling the gelatinized dough pieces to a temperature of from above 150° F. to 205° F.,
   pelletizing the dough pieces,
   partially drying the pellets to from 15% to 21% moisture,
   flaking the pellets and drying the flakes to a moisture content of from 1% to 3.5% moisture under conditions such that the temperature of the flakes does not exceed 250° F.

8. A process for preparing a breakfast cereal product, the breakfast cereal product being suitable for use as both hot and cold cereal which has retained substantially all of its pre-processing nutritive value, which comprises
   gelatinizing hydrated, ungelatinized dough pieces comprising a major proportion of at least one nutritious cereal flour and from 1.5% to 10% milk protein having a moisture content of from 30% to 32% moisture at a temperature of from 215° F. to 265° F. at a pressure of from 1 to 23 p.s.i.g.,
cooling the gelatinized dough pieces to a temperature of from above 150° F. to 205° F.,
pelletizing the dough pieces,
partially drying the pellets to from 15% to 21% moisture,
flaking the pellets and drying the flakes to a moisture content of from 1% to 3.5% moisture under conditions such that the temperature of the flakes does not exceed 250° F.

9. A process for preparing a breakfast cereal product, the breakfast cereal product being suitable for use as both hot and cold cereal which has retained substantially all of its pre-processing nutritive value, which comprises
gelatinizing hydrated, ungelatinized dough pieces comprising a major proportion of at least one nutritious cereal flour and from 1.5% to 10% milk protein having a moisture content of from 26% to 29% moisture at a temperature of from 215° F. to 265° F. at a pressure of from 1 to 23 p.s.i.g. by direct contact with steam,
cooling the gelatinized dough pieces to a temperature of from above 150° F. to 205° F.,
pelletizing the dough pieces,
partially drying the pellets to from 5% to 15% moisture,
vacuum puffing the pellets and drying the puffed pellets to a moisture content of from 1% to 3.5% moisture under conditions such that the temperature of the puffed pellets does not exceed 250° F.

10. A process for preparing a breakfast cereal product, the breakfast cereal product being suitable for use as both hot and cold cereal which has retained substantially all of its preprocessing nutritive value, which comprises
gelatinizing hydrated, ungelatinized dough pieces comprising a major proportion of at least one nutritious cereal flour and from 1.5% to 10% milk protein having a moisture content of from 30% to 32% moisture at a temperature of from 215° F. to 265° F. at a pressure of from 1 to 23 p.s.i.g.,
cooling the gelatinized dough pieces to a temperature of from above 150° F. to 205° F.,
pelletizing the dough pieces,
partially drying the pellets to from 5% to 15% moisture,
vacuum puffing the pellets and drying the puffed pellets to a moisture content of from 1% to 3.5% moisture under conditions such that the temperature of the puffed pellets does not exceed 250° F.

11. A process for preparing a breakfast cereal product, the breakfast cereal product being suitable for use as both hot and cold cereal which has retained substantially all of its pre-processing nutritive value, which comprises
hydrating ungelatinized breakfast cereal solids comprising a major proportion of at least one nutritious cereal flour and from 1.5% to 10% milk protein to a moisture content of from 26% to 29%,
mixing and agglomerating said hydrated mixture to form dough pieces,
pelletizing said dough pieces,
gelatinizing said pellets at a temperature of from 215° F. to 265° F. and a pressure of from 1 to 23 p.s.i.g. by direct contact with steam,
cooling said pellets to a temperature of from above 150° F. to 205° F.,
partially drying said pellets to from 15% to 21% moisture,
flaking the pellets and drying the flakes to a moisture content of from 1% to 3.5% under conditions such that the temperature of the flakes does not exceed 250° F.

12. A process for preparing a breakfast cereal product, the breakfast cereal product being suitable for use as both hot and cold cereal which has retained substantially all of its pre-processing nutritive value, which comprises
hydrating ungelatinized breakfast cereal solids comprising a major proportion of at least one nutritious cereal flour and from 1.5% to 10% milk protein to a moisture content of from 30% to 32%,
mixing and agglomerating said hydrated mixture to form dough pieces,
pelletizing said dough pieces,
gelatinizing said pellets at a temperature of from 215° F. to 265° F. at a pressure of from 1 to 23 p.s.i.g.,
cooling said pellets to a temperature of from above 150° F. to 205° F.,
partially drying the pellets to from 15% to 21% moisture,
flaking the pellets and drying the flakes to a moisture content of from 1% to 3.5% moisture under conditions such that the temperature of the flakes does not exceed 250° F.

13. A process for preparing a breakfast cereal product the breakfast cereal product being suitable for use as both hot and cold cereal which has retained substantially all of its pre-processing nutritive value, which comprises
hydrating ungelatinized breakfast cereal solids comprising a major proportion of its least one nutritious cereal flour and from 1.5% to 10% milk protein to a moisture content of from 26% to 29%,
mixing and agglomerating said hydrated mixture to form dough pieces,
pelletizing said dough pieces,
gelatinizing said pellets at a temperature of from 215° F. to 265° F. and a pressure of from 1 to 23 p.s.i.g. by direct contact with steam,
cooling said pellets to a temperature of from above 150° F. to 205° F.,
partially drying said pellets to from 5% to 15% moisture,
vacuum puffing the pellets and drying the puffed pellets to a moisture content of from 1% to 3.5% under conditions such that the temperature of the puffed pellets does not exceed 250° F.

14. A process for preparing a breakfast cereal product, the breakfast cereal product being suitable for use as both hot and cold cereal which has retained substantially all of its pre-processing nutritive value, which comprises
hydrating ungelatinized breakfast cereal solids comprising a major proportion of at least one nutritious cereal flour and from 1.5% to 10% milk protein to a moisture content of from 30% to 32%,
mixing and agglomerating said hydrated mixture to form dough pieces,
pelletizing said dough pieces,
gelating said pellets at a temperature of from 215° F. to 265° F. at a pressure of from 1 to 23 p.s.i.g.,
cooling said pellets to a temperature of from above 150° F. to 205° F.
partially drying the pellets to from 5% to 15% moisture,
vacuum puffing the pellets and drying the puffed pellets to a moisture content of from 1% to 3.5% moisture under conditions such that the temperature of the puffed pellets does not exceed 250° F.

References Cited by the Examiner

UNITED STATES PATENTS

| | | | |
|---|---|---|---|
| 1,890,697 | 12/1932 | Scanlan | 99—81 |
| 1,925,267 | 9/1933 | McKay | 99—81 |
| 2,954,296 | 9/1960 | Clausi et al. | 99—82 |
| 3,121,637 | 2/1964 | Clausi et al. | 99—80 |

A. LOUIS MONACELL, *Primary Examiner.*

RAYMOND N. JONES, *Examiner.*